US012577934B2

(12) United States Patent
Hansen

(10) Patent No.: US 12,577,934 B2
(45) Date of Patent: Mar. 17, 2026

(54) HYDRAULIC DEVICE FOR A PITCH SYSTEM, A PITCH SYSTEM AND WIND TURBINE

(71) Applicant: HAWE Hydraulik SE, Aschheim (DE)

(72) Inventor: Jesper Berg Hansen, Albertslund (DK)

(73) Assignee: HAWE Hydraulik SE, Aschheim (DE)

( * ) Notice: Subject to any disclaimer, the term of this patent is extended or adjusted under 35 U.S.C. 154(b) by 0 days.

(21) Appl. No.: 18/985,537

(22) Filed: Dec. 18, 2024

(65) Prior Publication Data

US 2025/0215852 A1 Jul. 3, 2025

(30) Foreign Application Priority Data

Dec. 29, 2023 (DE) ..................... 10 2023 213 363.6

(51) Int. Cl.
*F03D 1/06* (2006.01)
*F03D 7/02* (2006.01)

(52) U.S. Cl.
CPC ......... *F03D 1/0669* (2023.08); *F03D 7/0224* (2013.01); *F05B 2260/79* (2013.01); *F05B 2270/604* (2013.01)

(58) Field of Classification Search
CPC .. F03D 1/0669; F03D 7/0224; F05B 2260/79; F05B 2270/604; Y02E 10/72
See application file for complete search history.

(56) References Cited

U.S. PATENT DOCUMENTS

| | | | | |
|---|---|---|---|---|
| 5,611,259 A | * | 3/1997 | Nagata | B30B 15/161 |
| | | | | 91/437 |
| 2010/0014972 A1 | * | 1/2010 | Steffensen | F03D 7/0264 |
| | | | | 416/31 |
| 2012/0134828 A1 | * | 5/2012 | Andersen | F03D 7/0264 |
| | | | | 416/147 |
| 2023/0349360 A1 | * | 11/2023 | Hansen | F03D 7/0224 |

FOREIGN PATENT DOCUMENTS

WO 2015014367 A1 2/2015

* cited by examiner

*Primary Examiner* — Hoang M Nguyen
(74) *Attorney, Agent, or Firm* — DINSMORE & SHOHL LLP

(57) ABSTRACT

A hydraulic device for a pitch system of a wind turbine includes an air separation device which includes a fluid collector having an air accumulation portion, at least one fluid inlet and a fluid outlet portion, wherein a fluid emulsion of air and hydraulic fluid can be introduced into the fluid collector through the at least one fluid inlet. The fluid collector is labyrinth-shaped so that rotation of the air separation device about an axis of rotation causes the air in the fluid emulsion to move through the labyrinth-shaped fluid collector in a direction to the air accumulation portion and the hydraulic fluid in the fluid emulsion to move through the labyrinth-shaped fluid collector in a direction to the fluid outlet portion.

16 Claims, 7 Drawing Sheets

HYDRAULIC DEVICE FOR A PITCH SYSTEM, A PITCH SYSTEM AND WIND TURBINE

CROSS REFERENCE TO RELATED APPLICATION

This application claims the priority benefit of German Patent Application No. 10 2023 213 363.6, filed on Dec. 29, 2023, the entire contents of which is incorporated herein by reference in its entirety.

FIELD

The present disclosure relates to a hydraulic device for a pitch system, a pitch system comprising such a hydraulic device and to a wind turbine comprising such a pitch system.

BACKGROUND

Such pitch systems are known from the prior art and are also referred to as pitch control systems. These pitch systems are configured to adapt the aerodynamic angle of attack on one or more rotor blades of the wind turbine and thus to adjust the so-called pitch. For this purpose, the rotor blades are rotatably disposed on a hub of a rotor of the wind turbine via a pitch bearing and a pitch gear. The pitch system changes the pitch of the rotor blades as a function of the instantaneous wind speed in order to operate the wind turbine with the best possible efficiency and therefore with largely constant rated power. For a number of purposes, the pitch angle of the rotor blades is adjusted to obtain the desired lift of the blades, including bringing the rotor to stop, limit energy intake from the wind to the blade, maintenance and so on. In other words, the angular position is adjusted to the wind direction.

In addition, the pitch systems are also configured to prevent damage to the wind turbine in strong winds by turning the rotor blades out of the wind i.e., into the so-called feather position. This interrupts the lift of the rotor blades and the rotor comes to a standstill, possibly with the support of a brake.

SUMMARY

A hydraulic device for a pitch system of a wind turbine comprising an air separation device is provided.

In one embodiment, the air separation device includes a fluid collector having an air accumulation portion, at least one fluid inlet and a fluid outlet portion. A fluid emulsion of air and hydraulic fluid can be introduced into the fluid collector through the at least one fluid inlet.

In one embodiment, the fluid collector is labyrinth-shaped so that rotation of the air separation device about an axis of rotation causes the air in the fluid emulsion to move through the labyrinth-shaped fluid collector in a direction to the air accumulation portion and the hydraulic fluid in the fluid emulsion to move through the labyrinth-shaped fluid collector in a direction to the fluid outlet portion.

In another embodiment, the hydraulic device further includes a reservoir having a variable-capacity fluid storage space.

In one embodiment, the labyrinth-shaped fluid collector is coiled about an axis.

In one embodiment, the air accumulation portion is the radially outermost portion of the labyrinth-shaped fluid collector.

In one embodiment, the fluid outlet portion is disposed radially inwardly of the air accumulation portion, and the at least one fluid inlet is disposed between the fluid outlet portion and the air accumulation portion.

In one embodiment, the fluid outlet portion is connected to the variable-capacity fluid storage space, and the axis is preferably a central axis.

In one embodiment, the labyrinth-shaped fluid collector comprises of one channel coiled about the central axis in preferably one plane.

In another embodiment, the fluid outlet portion comprises at least one through hole, and the at least one through hole is preferably connected to the variable-capacity fluid storage space.

In another embodiment, the hydraulic device further comprises an air outlet and an air drain valve, wherein the air accumulation portion is connected to the air outlet via the air drain valve.

In one embodiment, a first detection sensor arrangement is disposed in the air accumulation portion, and opening and closing of the air drain valve is controlled via measuring signals of the first detection sensor arrangement.

In one embodiment, the reservoir comprises a housing and a piston movably disposed in said housing, where the piston separates the housing into the variable-capacity fluid storage space and an air space, and the reservoir preferably is a bootstrap reservoir.

In one embodiment, the air separation device is disposed within the housing.

In one embodiment, the air accumulation portion is connected to the air space and a second detection sensor arrangement is disposed in the air space.

A pitch system for a wind turbine is also disclosed. In one embodiment, the pitch system comprises at least one hydraulic actuator, a hydraulic pump, a hydraulic accumulator, and a hydraulic device according to the embodiments disclosed herein. In one embodiment, the hydraulic device is connected to the hydraulic accumulator and the hydraulic pump, and the hydraulic pump is configured to drive the hydraulic actuator and to load the hydraulic accumulator.

A wind turbine is also disclosed. In one embodiment, the wind turbine comprises a nacelle, a hub rotatably supported at the nacelle, at least one rotor blade supported at the hub and at least one pitch system according to the embodiments disclosed herein. In one embodiment, the at least one pitch system is disposed in the hub, and the at least one pitch system is configured to adjust a pitch angle between the at least one rotor blade and the hub.

BRIEF DESCRIPTION

DETAILED DESCRIPTION

Figure 1:
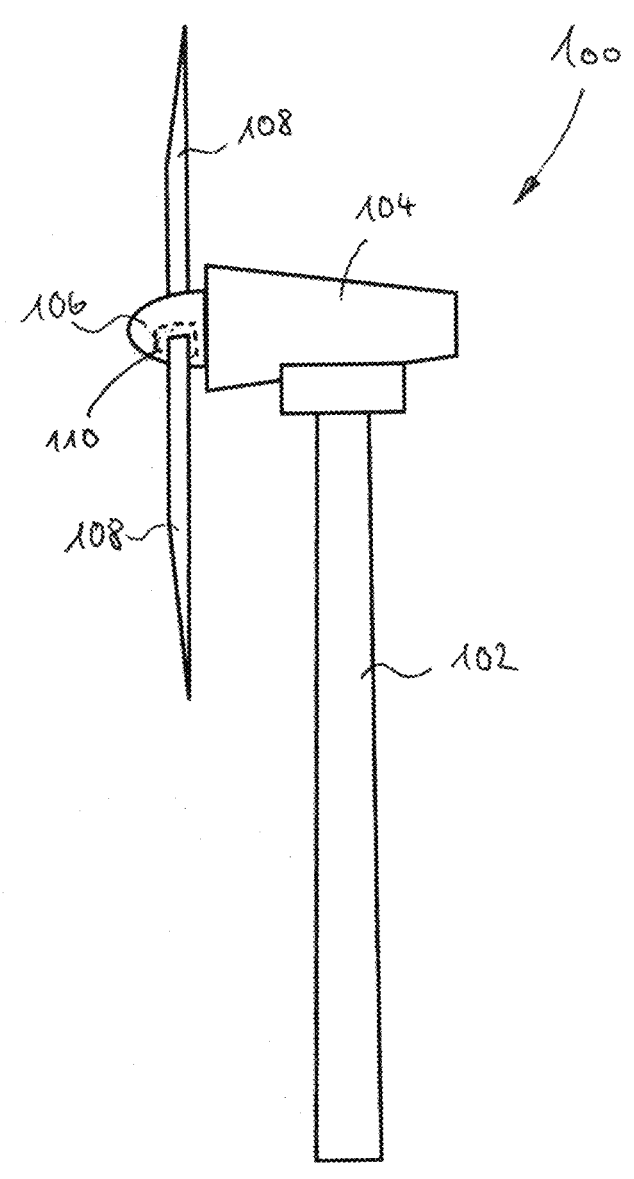
FIG. 1 is a side view of a wind turbine.

The known pitch systems comprise a hydraulic drive unit configured to adapt the pitch of one or all rotor blades of the wind turbine. Therefore, a hydraulic actuator, like a pitch cylinder, may be pressurized by a hydraulic pump to extend and retract to adapt the pitch. A hydraulic accumulator is usually provided to account for the volumetric difference between the piston side and the rod side of the pitch cylinder. When pressurizing the rod side of the piston, the differential volume exiting the piston side is loaded into the hydraulic accumulator. Accordingly, the hydraulic accumulator is unloaded when pressurizing the rod side of the pitch cylinder.

Modern wind turbines are usually not of the direct-drive type, but have a gearbox between the hub and the generator disposed in the nacelle. Thus, in case hydraulic components like the hydraulic pump and the hydraulic accumulator are disposed in the nacelle, the conduits need to be passed through the gearbox, which makes service and maintenance of the conduits highly complicated. Furthermore, as the hub is rotating relative to the nacelle, rotary transfer joints need to be installed to allow for transmission of the hydraulic fluid to the pitch cylinders. For safety reasons, the correct functioning of the wind turbine and thus also of the rotary transfer joints need to be tested prior to initial operation of the wind turbine. Especially in the case of offshore wind turbines, this means that the wind turbine needs to be pre-assembled for testing or that the testing is carried out when the wind turbine is placed already offshore and completely assembled. In any case, this is cumbersome and generates a high amount of costs.

To reduce the effort for testing and to reduce the number of transmission components and potential leakage points, the hydraulic pitch system may be provided as a closed system which is entirely disposed within the hub. Thus, there is no need for hydraulic rotary transfer joints and the testing of the entire hydraulic pitch system can be conducted prior to assembly of the wind turbine. However, as the hydraulic pump is then also rotating together with hub during operation of the wind turbine, it needs to be warranted that the pitch cylinder may be pressurized independently of the orientation of the hydraulic pump.

Thus, it has been proposed to use a so-called bootstrap reservoir to warrant supply of hydraulic fluid to the hydraulic pump in any orientation of the hub and hence of the hydraulic pump. Such bootstrap reservoirs usually comprise of a reservoir piston defining a variable-capacity fluid storage space and a pilot piston acting upon the reservoir piston. The pilot piston is pressurized by the pitch system pressure and establishes a preload within the variable-capacity fluid storage space via the reservoir piston. An according hydraulic pitch system is known from e.g., WO 2015/014367 A1.

However, during operation of the hydraulic pitch system air or gas respectively inevitably enters the hydraulic fluid e.g., through the pitch cylinder rod seals, the bootstrap reservoir piston seals, the hydraulic pump shaft seals or even during maintenance or replacement of components. Although bootstrap reservoirs are known from other applications e.g., from airplane hydraulic applications, de-airing is usually not a problem in those applications as de-airing may be conducted manually or by respective valves during normal maintenance when the airplane is grounded.

However, manually de-airing of the hydraulic pitch system of an offshore wind turbine is usually not easily possible, as the wind turbine is placed remote and the time interval between normal maintenance is too long.

Hence, there is the need to provide a hydraulic device for a pitch system to be completely installed in the hub of a wind turbine which allows for facilitated de-airing.

The solution of the problem is achieved with a hydraulic device according to the disclosed embodiments. Furthermore, the solution is also achieved with a pitch system according to the disclosed embodiments and a wind turbine according to the disclosed embodiments.

According to the disclosure, a hydraulic device for a pitch system of a wind turbine is provided which comprises an air separation device. The air separation device comprises a fluid collector having an air accumulation portion, at least one fluid inlet and a fluid outlet portion. A fluid emulsion of air and hydraulic fluid can be introduced into the fluid collector through the at least one fluid inlet. The fluid collector is labyrinth-shaped so that rotation of the air separation device about an axis of rotation causes the air in the fluid emulsion to move through the labyrinth-shaped fluid collector in a direction to the air accumulation portion. Rotation of the air separation device further causes the hydraulic fluid in the fluid emulsion to move through the labyrinth-shaped fluid collector in a direction to the fluid outlet portion.

Thus, over the course of a rotation of the labyrinth-shaped fluid collector, the shape of the labyrinth is such that a low-mass particle (i.e., air), starting from any position in the labyrinth-shaped fluid collector, has changed its position in the labyrinth-shaped fluid collector in a direction opposite to that of a high-mass particle (i.e., hydraulic fluid) starting from the same position. For each starting position of the particle the moving direction of the low-mass particle must be the same, namely towards the air accumulation portion. The axis of rotation does not need to run through the air separation device. Rather, the axis of rotation may be the axis of rotation of the hub relative to the nacelle of the wind turbine.

Preferably, the hydraulic device comprises a reservoir having a variable-capacity fluid storage space. The labyrinth-shaped fluid collector may be coiled about an axis. The axis may be a central axis. The air accumulation portion may be the radially outermost portion of the labyrinth-shaped fluid collector. The fluid outlet portion may be disposed radially inwardly of the air accumulation portion and the at least one fluid inlet may be disposed between the fluid outlet portion and the air accumulation portion. The fluid outlet portion is connected to the variable-capacity fluid storage space.

Thus, the labyrinth-shaped fluid collector is configured as a coiled fluid collector. The hydraulic fluid intended to enter the variable-capacity fluid storage space has to pass the coiled fluid collector first. Since air likely present in the hydraulic fluid is lighter than the hydraulic fluid, it tends to accumulate in the top portion due to gravity. Hence the air accumulates in the radially outermost air accumulation portion during rotation of the hydraulic device, as the latter one rotates together with the hub during operation of the wind turbine. Hence, the air can be separated out of the hydraulic fluid.

Depending on the orientation of the labyrinth-shaped fluid collector (i.e., clockwise or counter-clockwise) and the rotation direction, the positions of the air accumulation portion and the fluid outlet portion may be changed. Hence, the air accumulation portion may also be the radially innermost portion.

Preferably, the labyrinth-shaped fluid collector comprises of one channel coiled about the central axis in preferably one plane. Thus, the only channel is winded about the central axis in one plane, which limits the necessary space, as being disc-shaped.

Preferably, the fluid outlet portion comprises at least one through hole, which is preferably connected to the variable-capacity fluid storage space. Preferably, a plurality of through holes are provided to allow the hydraulic fluid separated from the air to exit the air separation device.

Preferably, the hydraulic device further comprises an air outlet and an air drain valve, wherein the air accumulation portion is connected to the air outlet via the air drain valve. Opening of the air drain valve allows the air accumulated in the air accumulation portion to exit the hydraulic device. When opening the air drain valve, the pressure of the hydraulic fluid pushes the air through the air drain valve.

Preferably, a first detection sensor arrangement is disposed in the air accumulation portion, wherein opening and closing of the air drain valve is controlled via measuring signals of the first detection sensor arrangement. If sufficient air has accumulated in the air accumulation portion thereby displacing the hydraulic fluid, this is detected by the first detection sensor arrangement and the air drain valve is opened to release the air through the air outlet. The air drain valve may be opened for a predetermined period of time or may be closed again based on a measuring signal indicating the presence of hydraulic fluid in virtually the entire air accumulation portion.

Preferably, the first detection sensor arrangement comprises an air detection sensor disposed at an end of the air accumulation portion opposite to the air outlet and a fluid detection sensor disposed between the air detection sensor and the air outlet. Preferably, the fluid detection sensor is disposed in close proximity to the air outlet. As soon as the sufficient air has accumulated in the air accumulation portion, the air detection sensor detects the presence of air and the air drain valve is opened based thereon. The pressure of the hydraulic fluid forces the air out of the air outlet and hydraulic fluid is staring to fill the air accumulation portion. If the air accumulation portion is nearly filled with hydraulic fluid, this is detected by the fluid detection sensor and the air drain valve is closed again based thereupon.

It is also conceivable to provide an air accumulation portion large enough to hold all the air collected between two maintenances. In that situation, the air drain valve could be manually operated or the accumulated air could be relieved by connecting a minimess hose to a test point.

Preferably, the reservoir comprises a housing and a piston movably disposed in said housing, wherein the piston separates the housing in the variable-capacity fluid storage space and an air space. The reservoir preferably is a bootstrap reservoir. Thus, the piston can also be referred to as the reservoir piston.

Preferably, the air separation device is disposed within the housing. This allows for a compact design.

Preferably, the air accumulation portion is connected to the air space. As it might happen that some hydraulic fluid escapes through air outlet, the hydraulic fluid is not spilled into the hub of the wind turbine, but is rather routed to air space for safety reasons. Hydraulic fluid may escape through the air outlet e.g., due to malfunction of the first detection sensor arrangement or of the air drain valve.

Preferably, a second detection sensor arrangement is disposed in the air space. The second detection sensor arrangement is preferably configured to sense the presence of fluid in the air space. Thus, in case hydraulic fluid is routed into the air space due to e.g., a malfunction, this is detected by the second detection sensor arrangement and appropriate measures can then be taken.

Alternatively, the reservoir may also be configured as a low-pressure accumulator with the hydraulic fluid being pressurized by e.g., Nitrogen. Alternatively, the air separation device may be configured as the reservoir with the hydraulic pump being directly connected to the fluid outlet portion.

The disclosure further relates to a pitch system for a wind turbine comprising at least one hydraulic actuator, a hydraulic pump, a hydraulic accumulator, and a hydraulic device as described above. The hydraulic device is connected to the hydraulic accumulator and the hydraulic pump, wherein the hydraulic pump is configured to drive the hydraulic actuator and to load the hydraulic accumulator.

The disclosure further relates to a wind turbine comprising a nacelle, a hub rotatably supported at the nacelle, at least one rotor blade supported at the hub and at least one pitch system. The at least one pitch system is disposed in the hub and is configured to adjust a pitch angle between the at least one rotor blade and the hub. Preferably, the wind turbine comprises one pitch system per rotor blade.

FIG. 1 depicts a side view of a wind turbine 100 according to the disclosure. The wind turbine 100 comprises a tower 102 and a nacelle 104 mounted to the tower 102. A hub 106 is rotatably supported by the nacelle 104. The wind turbine 100 further comprises a plurality of rotor blades 108 which are mounted to the hub 106. One hydraulic pitch system 110 (see FIG. 2) per rotor blade 108 is provided within the hub 106. Each hydraulic pitch system 110 is configured to adapt the aerodynamic angle of attack of the associated rotor blade 108 of the wind turbine 100. The pitch system 110 changes the pitch of the rotor blade 108 as a function of the instantaneous wind speed in order to operate the wind turbine 100 with the best possible efficiency and therefore with largely constant rated power. For this purpose, the rotor blade 108 are adjusted in their angular position relative to the hub 106 via the pitch system 110 in such a way that the desired lift is generated. The pitch system 100 is further configured to prevent damage to the wind turbine 100 in strong winds by turning the rotor blade 108 out of the wind, i.e., into the so-called feather position. This interrupts the lift of the rotor blade 108 and the rotor comes to a standstill. Of course, it is also possible that only one hydraulic pitch system 110 is provided which adjusts the angles of all rotor blades 108.

Figure 2:
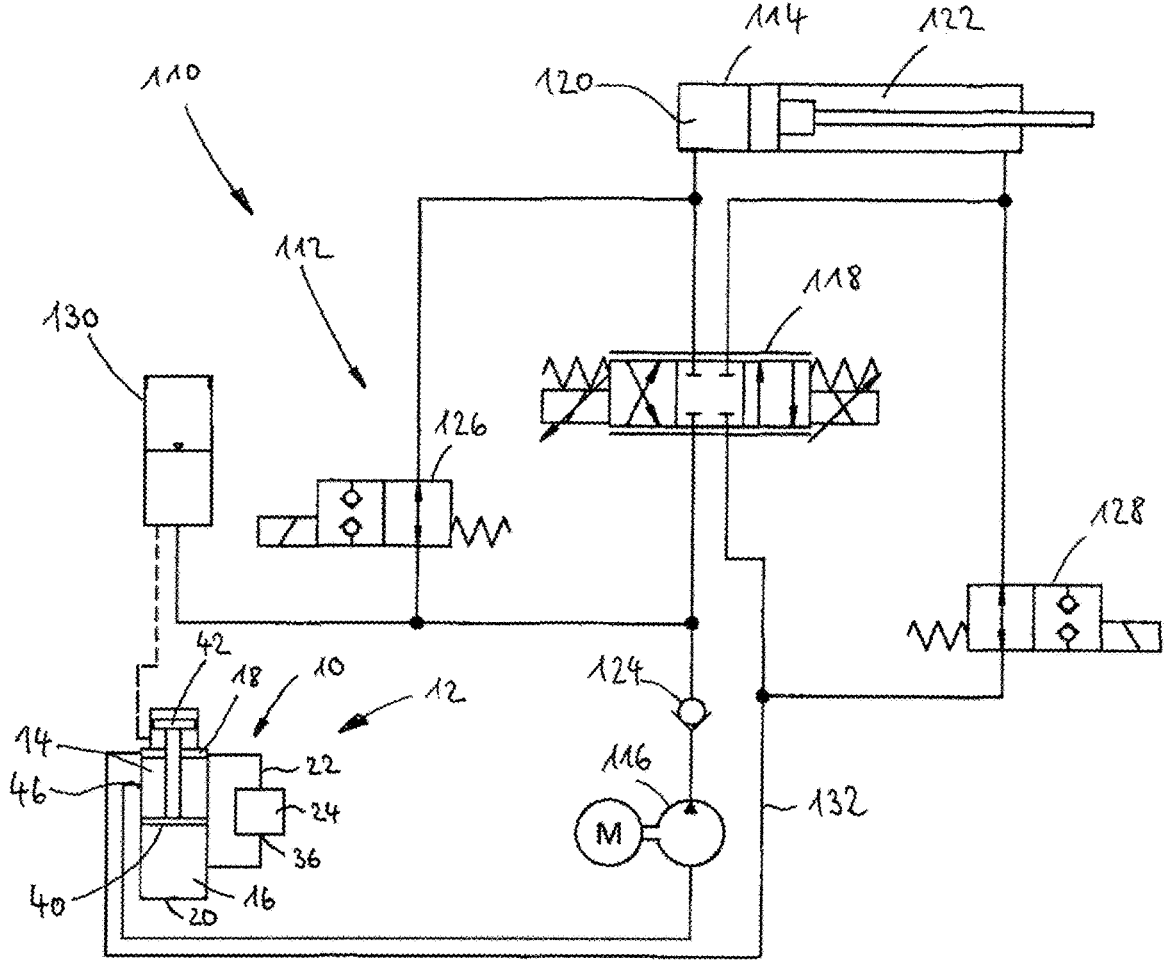
FIG. 2 is a hydraulic circuit diagram of pitch system with a hydraulic device.
Figure 3:
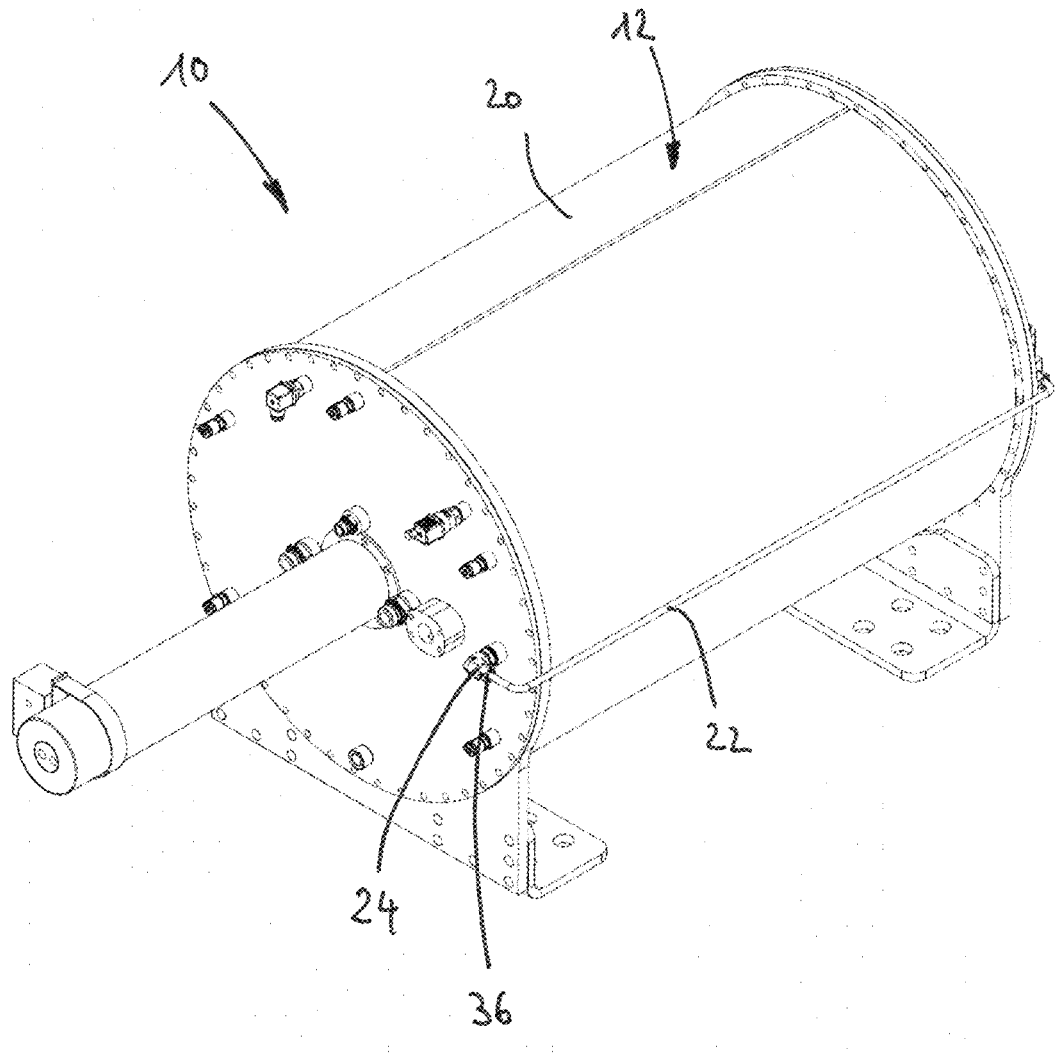
FIG. 3 is a perspective view of the hydraulic device.
Figure 4:
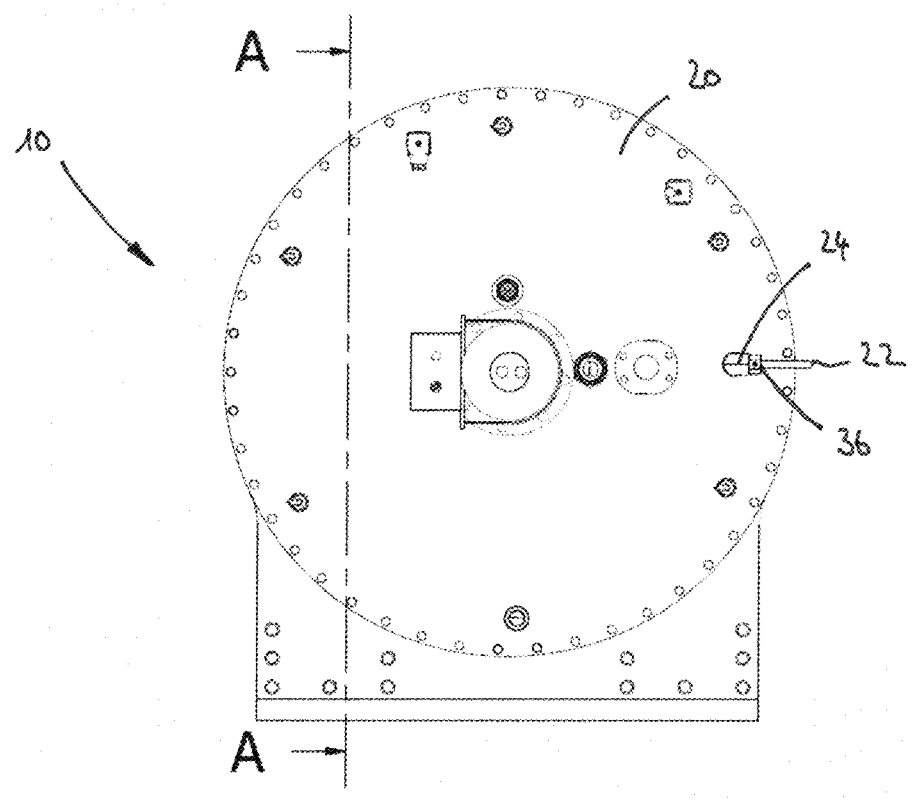
FIG. 4 is a first side view of the hydraulic device of FIG. 3.
Figure 5:
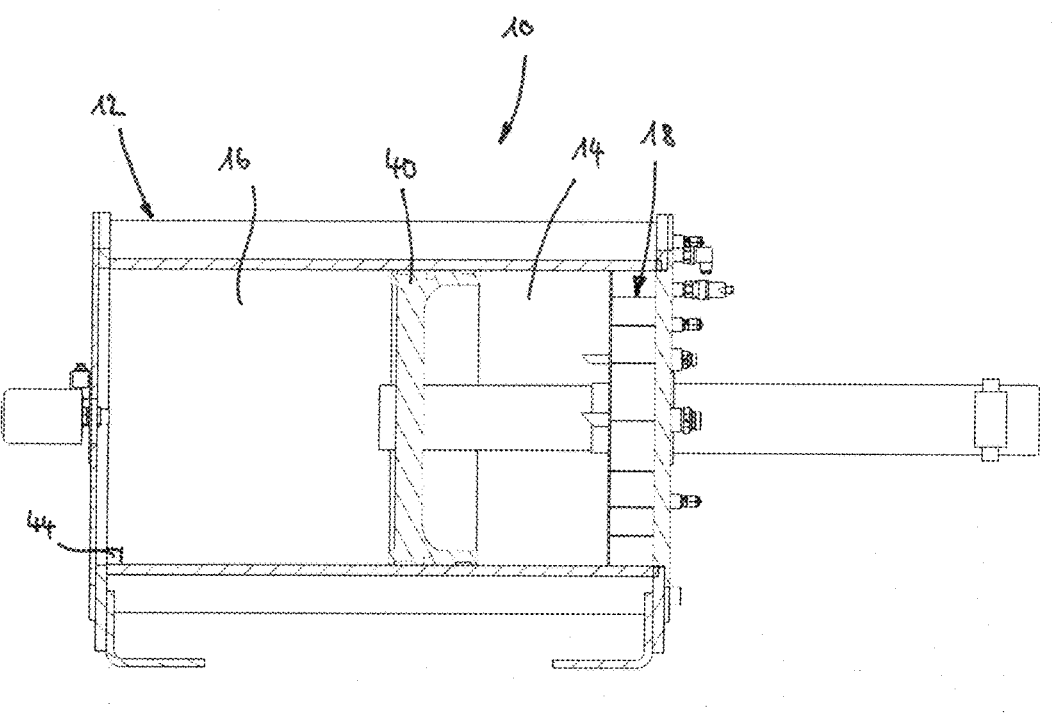
FIG. 5 is a first cross section along the line A-A shown in FIG. 4.
Figure 6:
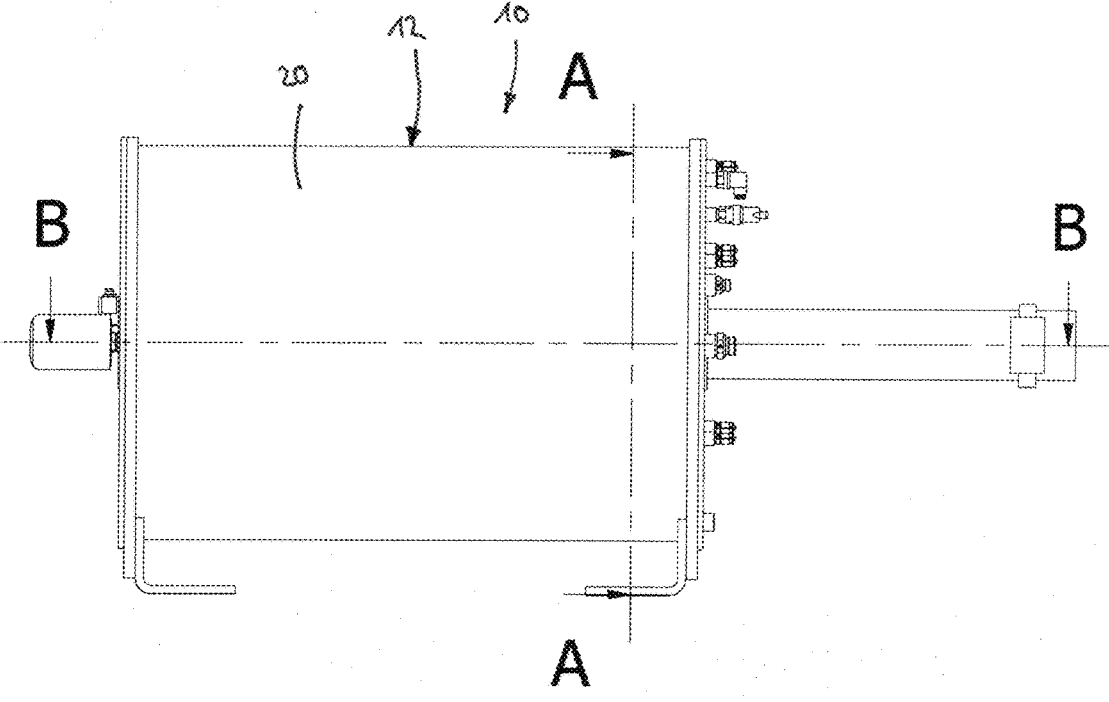
FIG. 6 is a second side view of the hydraulic device of FIG. 3.

In this exemplary embodiment, the pitch system 110 comprises a hydraulic circuit 112 for extending and retracting a hydraulic actuator 114 in the form of a pitch cylinder. A hydraulic pump 116 is driven by an electric motor M to provide the pressurized hydraulic fluid. As shown in FIG. 2, a first valve 118 is provided upstream of the hydraulic pump 116 to connect the hydraulic pump 116 either to a piston side 120 or a rod side 122 of the pitch cylinder 114. The first valve 118 is configured as an electromagnetic proportional 4/3 spool valve. A check valve 124 is provided between the hydraulic pump 116 and the first valve 118 for inhibiting backflow to the hydraulic pump 116. The hydraulic circuit further comprises a second electromagnetic valve 126 and a third electromagnetic valve 128 bypassing the first valve 118. A hydraulic accumulator 130 is connected to the high-pressure side of the hydraulic pump 116. The hydraulic accumulator 130 is configured to accommodate the volume difference between the rod side 122 and the piston side 120 of the pitch cylinder 114.

In addition, a hydraulic device 10 is provided at the low-pressure side of the hydraulic pump 116. The hydraulic device 10 is further connected to the first valve 118 via a return line 132. As shown in FIG. 2, the third valve 128 is configured to bypass the first valve 118 and to directly connect the rod side 122 with the return line 132.

The hydraulic device 10 comprises a reservoir 12 having a variable capacity fluid storage space 14 and an air space 16. In this exemplary embodiment, the reservoir is a bootstrap reservoir 12. The hydraulic device 10 further comprises an air separation device 18 configured to remove air from the hydraulic fluid. As shown, the air separation device 18 is disposed in the bootstrap reservoir 12. In particular, the bootstrap reservoir 12 comprises a housing 20 with the air separation device 18 being disposed in the housing 20 and being connected to the air space 16 via a tube 22 and an air drain valve 24. The bootstrap reservoir 12 and the air separation device 18 will now be explained in more detail by reference to FIGS. 3 to 8.

A first piston 40 is movably disposed within the housing 20 of the bootstrap reservoir 12. The first piston 40 is connected to second piston 42 having a smaller diameter than the first piston 40. The first piston 40 separates the housing 20 into the variable capacity fluid storage space 14 and the air space 16. Hence, the first piston 40 is the reservoir piston of the bootstrap reservoir 12. The second piston 42 can be pressurized via the hydraulic accumulator 30 (see FIG. 2) so that it moves the first piston 40 to pressurize the hydraulic fluid contained in the variable capacity fluid storage space 14. Accordingly. the second piston 42 is the pilot piston of the bootstrap reservoir 12. The variable capacity fluid storage space 14 is connected to the hydraulic pump 116 on the low-pressure side via suction ports 46 so that the hydraulic pump 116 can be supplied with hydraulic fluid irrespective of the orientation of the hub 106 and hence of the pitch system 110.

Hydraulic fluid returning form the pitch cylinder 114 via the first valve 118 and the return line 132 is returned to the bootstrap reservoir 12 and loaded into the variable-capacity fluid storage space 14. The entire hydraulic circuit 112 is controlled by a (not shown) system controller in a generally known way in that various input parameters are used e.g., pressure at the low-pressure side of the hydraulic pump 116, pressure in the hydraulic accumulator 130 etc.

Although the hydraulic circuit 112 shown in FIG. 2 is configured as a closed hydraulic circuit during normal operation, air will inevitably enter the hydraulic fluid e.g., via pitch cylinder rod seals, the bootstrap reservoir piston seals, the pump shaft seals or during maintenance and replacement of the components. To avoid a negative impact on the performance of the hydraulic circuit 112 the air separation device 18 is provided.

Figure 7:
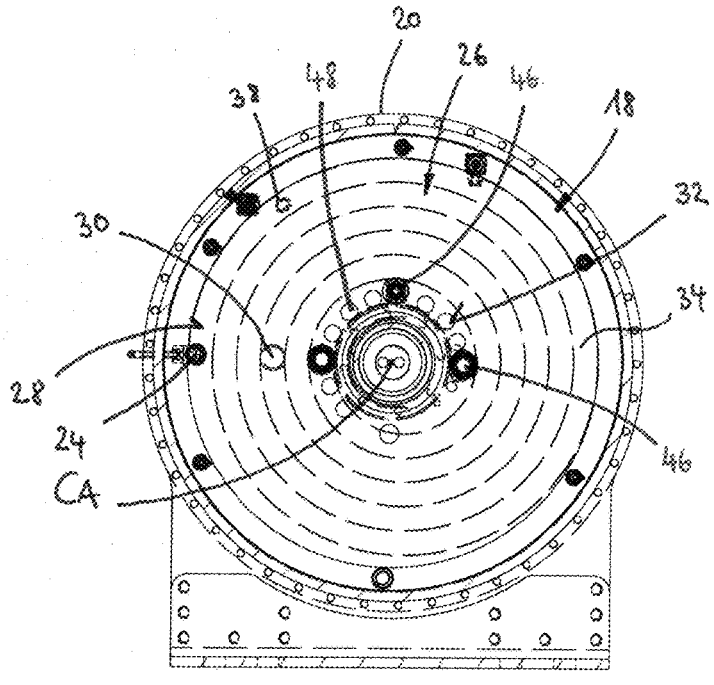
FIG. 7 is a second cross section along the line A-A shown in FIG. 6.
Figure 8:
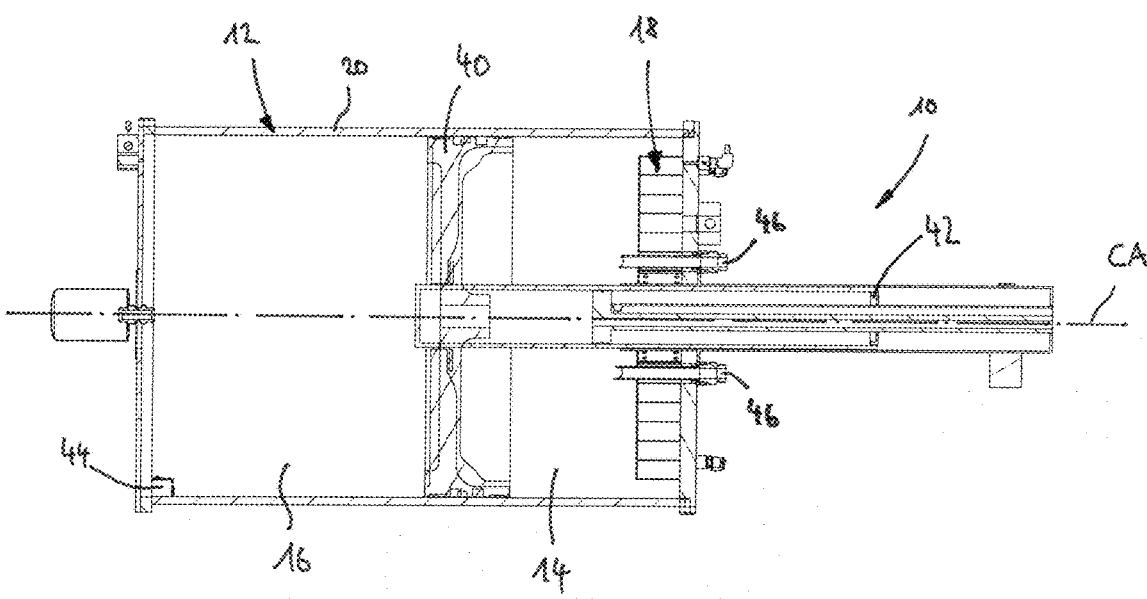
FIG. 8 is a third cross section along the line B-B shown in FIG. 6.

The air separation device 18 is provided within the housing 20 and hydraulic fluid returning via the return line 132 has first of all flow through the air separation device 18 before being loaded into the variable-capacity fluid storage space 14. The air separation device 18 comprises of only one channel 34 being coiled about a central axis CA of the air separation device 18 and the bootstrap reservoir 12 respectively. As depicted in FIGS. 7 and 8, the channel 34 winds about the central axis CA in one plane thereby forming a labyrinth-shaped fluid collector 26. As shown, the labyrinth shaped fluid collector 26 is a coiled fluid collector. Of course, the labyrinth-shaped fluid collector 26 may also have a different shape e.g., coiled offset of the central axis CA or being constituted of a tube having non-uniform windings. The only necessity is that the windings or loops all have the same winding direction e.g., clockwise.

The radially outermost portion of the labyrinth-shaped fluid collector 26 relative to the central axis CA forms an air accumulation portion 28. The radially innermost portion of the labyrinth-shaped fluid collector 26 relative to the central axis CA forms a fluid outlet portion 32. A plurality of through holes 48 are provided at the fluid outlet portion 32 which open into the variable-capacity fluid storage space 14. A fluid inlet 30 connected to the return line 132 is provided between the air accumulation portion 28 and the fluid outlet portion 28. The air accumulation portion 28 is connected to an air outlet 36 via the air drain valve 24. The tube 22 is connected to the air outlet 36 so that air exiting the air separation device 18 is directed into the air space 16, as will be described in more detail below. Furthermore, a first detection sensor arrangement 38 is disposed in the air accumulation portion 28 and a second detection sensor arrangement 44 is disposed in the air space 16.

Figure 9:
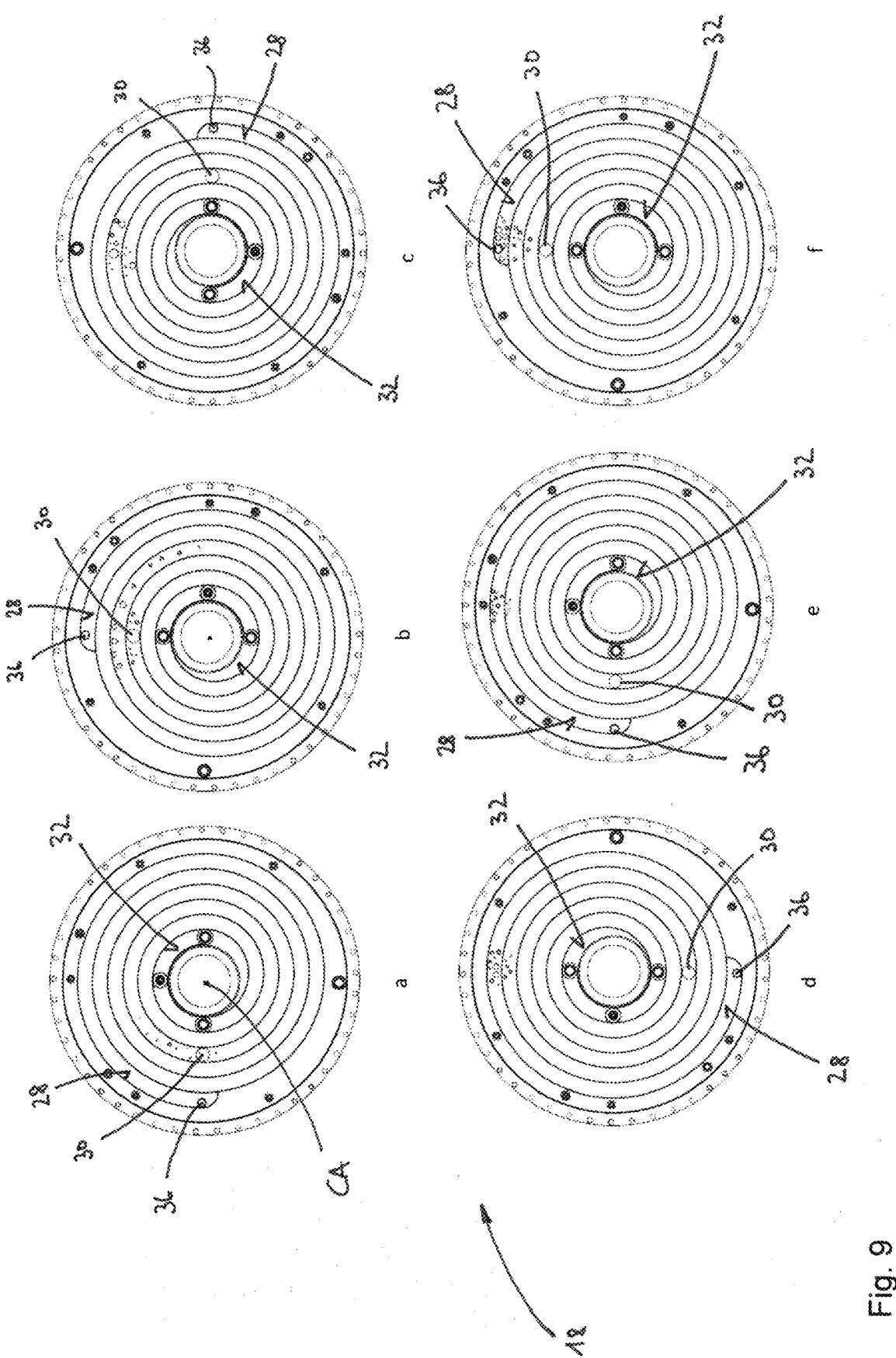
FIG. 9 is an overview of the states of the hydraulic device during rotation of the wind turbine.

The hydraulic fluid returning into the air separation device 18 via the fluid inlet 30 is an emulsion of hydraulic fluid and air, the latter one is to be separated from the hydraulic fluid. Upon rotation of the bootstrap reservoir 12 and hence of the air separation device 18 together with the hub 106 about an axis of rotation the air is separated from the hydraulic fluid due to gravity within the air separation device 18. As shown in FIG. 9(*a*) the hydraulic fluid enters into the air separation device 18 via the fluid inlet 30 whereby the air is depicted by little circles or bubbles in this representation. The air separation device 18 is continuously rotated in the clockwise direction during operation of the wind turbine 100 so that the air tends to accumulate in that portion of the coiled fluid collector 18 pointing upwards i.e., opposite to the direction of gravity, see FIGS. 9(*b*) to 9(*f*) showing the passage of the air through the channel 34 of the labyrinth-shaped fluid collector 26 for several rotations of the air separation device 18. In other words, as the air is lighter than the hydraulic fluid, the air accumulates in that portion of the coiled fluid collector 26 pointing upwards in a direction opposite to gravity. As the coiled fluid collector 26 rotates further, air is guided along the channel 34 from the fluid inlet 30 to the air accumulation portion 28.

As the air accumulation portion 28 is the radially outermost portion of the coiled fluid collector 26 the air tends to accumulate in the air accumulation portion 28. Likewise, the hydraulic fluid then separated from the air tends to accumulate in the fluid outlet portion 32 and is loaded into the variable-capacity fluid storage space via the plurality of through holes 48.

The first detection sensor arrangement 38 is configured to sense the presence of air and liquid in the air accumulation portion 28. In particular, the first detection sensor arrangement 38 may comprise a fluid detection sensor disposed in close vicinity of the air outlet 36 and an air detection sensor disposed remote from the fluid detection sensor in the air accumulation portion 28 i.e., at the end of the air accumulation portion 28. The air accumulating in the air accumulation portion 28 displaces the hydraulic fluid in the air accumulation portion 28 upon rotation of the air separation device 18. As soon as a certain amount of air is accumulated in the air accumulation portion 28, the air detection sensor is no longer in contact with hydraulic fluid, but with air. Thus, the air detection sensor detects the presence of air and the respective measurement signal is provided to the control system which opens the air drain valve 24. Due to the higher pressure of the hydraulic fluid in the air separation device 18, the air is then forced out of the air accumulation portion 28 through the air outlet 36 and hydraulic fluid is filing the air accumulation portion 28. As soon as the fluid detection sensor is no longer in contact with air, but with hydraulic fluid a respective measurement signal is provided to the control system which thus closes the air drain valve 24 and the accumulation of air in the air accumulation portion 28 again begins.

As it may happen that hydraulic fluid escapes through the air outlet 36, the air outlet 36 is connected to the air space 16 via the tube 22. Thus, hydraulic fluid is not spilled into the hub 106, but into the air space 16. In case of malfunction of e.g., the air drain valve 24 a larger amount of hydraulic fluid is delivered into the air space 16. The presence of the hydraulic fluid in the air space 16 is then detected by the second detection sensor arrangement 44 disposed in the air space 16 and a respective measurement signal is generated and signaled to the control system. Thus, appropriate counter measures can then be taken, like an emergency stop of the wind turbine 100.

The air space 16 may be connected to the environment by an air filter configured to withstand a certain amount of hydraulic fluid, as little amounts of hydraulic fluid may leak into the air space 16 via the tube 22 even during normal operation of the pitch system 110.

As the air separation device 18 is provided at a cover of the housing 20 of the bootstrap reservoir 12, the air separation device 18 can be retrofitted to existing bootstrap reservoirs 12.

The invention claimed is:

1. A hydraulic device for a pitch system of a wind turbine comprising an air separation device,
   the air separation device comprising a fluid collector having an air accumulation portion, at least one fluid inlet and a fluid outlet portion,
   wherein a fluid emulsion of air and hydraulic fluid can be introduced into the fluid collector through the at least one fluid inlet,
   wherein the fluid collector is labyrinth-shaped so that rotation of the air separation device about an axis of rotation causes the air in the fluid emulsion to move through the labyrinth-shaped fluid collector in a direction to the air accumulation portion and the hydraulic fluid in the fluid emulsion to move through the labyrinth-shaped fluid collector in a direction to the fluid outlet portion.

2. The hydraulic device according to claim 1, wherein the hydraulic device further comprises a reservoir having a variable-capacity fluid storage space,
   wherein the labyrinth-shaped fluid collector is coiled about an axis,
   wherein the air accumulation portion being a radially outermost portion of the labyrinth-shaped fluid collector, wherein the fluid outlet portion is disposed radially inwardly of the air accumulation portion, and wherein the at least one fluid inlet is disposed between the fluid outlet portion and the air accumulation portion,
   wherein the fluid outlet portion is connected to the variable-capacity fluid storage space.

3. The hydraulic device according to claim 2, wherein the labyrinth-shaped fluid collector comprises one channel coiled about the central axis.

4. The hydraulic device according to claim 2, wherein the fluid outlet portion comprises at least one through hole.

5. The hydraulic device according to claim 1, wherein the hydraulic device further comprises an air outlet and an air drain valve, wherein the air accumulation portion is connected to the air outlet via the air drain valve.

6. The hydraulic device according to claim 5, wherein a first detection sensor arrangement is disposed in the air accumulation portion, wherein opening and closing of the air drain valve is controlled via measuring signals of the first detection sensor arrangement.

7. The hydraulic device according to claim 2, wherein the reservoir comprises a housing and a piston movably disposed in said housing, wherein the piston separates the housing into the variable-capacity fluid storage space and an air space.

8. The hydraulic device according to claim 7, wherein the air separation device is disposed within the housing.

9. The hydraulic device according to claim 7, wherein the air accumulation portion is connected to the air space.

10. The hydraulic device according to claim 9, wherein a second detection sensor arrangement is disposed in the air space.

11. A pitch system for a wind turbine comprising at least one hydraulic actuator, a hydraulic pump, a hydraulic accumulator, and a hydraulic device according to claim 1, wherein the hydraulic device is connected to the hydraulic accumulator and the hydraulic pump, wherein the hydraulic pump is configured to drive the hydraulic actuator and to load the hydraulic accumulator.

12. A wind turbine comprising a nacelle, a hub rotatably supported at the nacelle, at least one rotor blade supported at the hub and at least one pitch system according to claim 11, wherein the at least one pitch system is disposed in the hub, and wherein the at least one pitch system is configured to adjust a pitch angle between the at least one rotor blade and the hub.

13. The hydraulic device according to claim 2, wherein the axis is a central axis.

14. The hydraulic device according to claim 3, wherein the one channel coiled about the central axis is in one plane.

15. The hydraulic device according to claim 4, wherein the at least one through hole is connected to the variable-capacity fluid storage space.

16. The hydraulic device according to claim 7, wherein the reservoir is a bootstrap reservoir.

* * * * *